United States Patent
Taylor et al.

(10) Patent No.: US 10,709,259 B2
(45) Date of Patent: Jul. 14, 2020

(54) LATCH MECHANISM AND TRAY ASSEMBLY

(71) Applicant: Wonderland Switzerland AG, Steinhausen (CH)

(72) Inventors: Andrew J. Taylor, Mohnton, PA (US); Andrew Ma, Exton, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 16/292,220

(22) Filed: Mar. 4, 2019

(65) Prior Publication Data
US 2019/0269256 A1   Sep. 5, 2019

Related U.S. Application Data

(60) Provisional application No. 62/638,333, filed on Mar. 5, 2018.

(51) Int. Cl.
*A47D 3/00* (2006.01)
*F16B 9/02* (2006.01)
*A47D 1/00* (2006.01)

(52) U.S. Cl.
CPC ............ *A47D 3/00* (2013.01); *A47D 1/0085* (2017.05); *F16B 9/02* (2013.01)

(58) Field of Classification Search
CPC ......... A47C 7/705; A47D 3/00; A47D 1/0085
USPC .............................. 297/153, 148, 145, 174 R
See application file for complete search history.

(56) References Cited

U.S. PATENT DOCUMENTS

| | | | | |
|---|---|---|---|---|
| 4,807,928 A * | 2/1989 | Cone | ...................... | A47B 23/02 297/153 |
| 5,468,043 A * | 11/1995 | Chien | .................. | A47D 1/0085 297/153 |
| 6,578,496 B2 * | 6/2003 | Guard | .................... | A47G 19/10 108/25 |
| 6,746,075 B2 * | 6/2004 | Cheng | .................... | B62B 9/245 297/149 |
| 6,920,830 B1 * | 7/2005 | Asbach | .................. | A47G 19/08 108/26 |
| 7,918,497 B2 * | 4/2011 | Keegan | .................... | A47D 1/04 297/130 |
| 7,922,244 B2 * | 4/2011 | Bearup | .................. | A47D 1/002 297/153 |

(Continued)

*Primary Examiner* — Jose V Chen
(74) *Attorney, Agent, or Firm* — Winston Hsu

(57) ABSTRACT

A latch mechanism includes a latch component and an engaging component. The latch component includes an operating portion, a mounting portion disposed on a first component, and a connecting portion made of resilient material and connected to the operating portion and the mounting portion. An engaging slot is formed on the connecting portion. The engaging component is disposed on a second component for engaging with or disengaging from the engaging slot. The engaging slot and the engaging component are engaged with each other so as to fix the first component on the second component when the latch mechanism is in a locking state. The connecting portion is resiliently deformed by the operating portion to disengage the engaging slot from the engaging component so as to release the first component from the second component when the operating portion is operated to switch the latch mechanism to a releasing state.

15 Claims, 11 Drawing Sheets

(56) References Cited

U.S. PATENT DOCUMENTS

| | | | | |
|---|---|---|---|---|
| 8,100,470 B1* | 1/2012 | Hu | ............................ | A47D 1/10 |
| | | | | 297/148 |
| 8,226,161 B2* | 7/2012 | Fiore, Jr. | ................. | A47D 1/103 |
| | | | | 297/153 |
| 8,696,055 B2* | 4/2014 | Stolarz | .................... | A47D 1/004 |
| | | | | 297/149 |
| 2002/0036416 A1* | 3/2002 | Mendenhall | ............ | A47D 15/00 |
| | | | | 297/148 |
| 2003/0218366 A1* | 11/2003 | Rho | ....................... | A47D 1/002 |
| | | | | 297/153 |
| 2004/0256895 A1* | 12/2004 | Bayard | .................. | A47D 1/004 |
| | | | | 297/153 |
| 2008/0067840 A1* | 3/2008 | McGrew | ................. | A47G 19/10 |
| | | | | 297/153 |
| 2009/0206638 A1* | 8/2009 | Hartenstine | ............ | A47D 1/002 |
| | | | | 297/149 |
| 2010/0072792 A1* | 3/2010 | Moore | .................... | B62B 9/245 |
| | | | | 297/153 |

\* cited by examiner

LATCH MECHANISM AND TRAY ASSEMBLY

CROSS REFERENCE TO RELATED APPLICATIONS

This application claims the benefit of U.S. Provisional Patent Application No. 62/638,333 filed on Mar. 5, 2018, which is hereby incorporated by reference in its entirety.

BACKGROUND OF THE INVENTION

1. Field of the Invention

The present invention relates to a latch mechanism and a child product therewith, and more particularly, to a latch mechanism with an extended service life and a tray assembly therewith.

2. Description of the Prior Art

A latch is commonly used for providing removability of two parts. For example, a storage tray can be attached onto or detached from a primary body of a child product by a latch. There are various latches available in the market. Some conventional latches have complicated structure for increasing operability, however, which not only results in high cost of production but also takes up much space. Furthermore, some conventional latches have simple structure but do not have enough strength, which causes either structural or functional failure after long-term usage. Therefore, there is a need to provide an improved latch having low cost of production, simple structure, strong strength and good operability.

SUMMARY OF THE INVENTION

It is an objective of the present invention to provide a latch mechanism and a tray assembly for solving the aforementioned problem.

In order to achieve the aforementioned objective, the present invention discloses a latch mechanism. The latch mechanism includes a latch component and an engaging component. The latch component includes an operating portion, a mounting portion disposed on a first component, and a connecting portion connected to the operating portion and the mounting portion. The connecting portion is made of resilient material. An engaging slot is formed on the connecting portion. The engaging component is disposed on a second component for engaging with or disengaging from the engaging slot. The engaging slot and the engaging component are engaged with each other so as to fix the first component on the second component when the latch mechanism is in a locking state, and the connecting portion is resiliently deformed by the operating portion to disengage the engaging slot from the engaging component so as to release the first component from the second component when the operating portion is operated to switch the latch mechanism from the locking state to a releasing state.

According to an embodiment of the present invention, the mounting portion is substantially formed in a tail shape and includes two lateral abutting parts and a middle abutting part, and the latch component is engaged onto the first component by the two lateral abutting parts and the middle abutting part of the mounting portion.

According to an embodiment of the present invention, the latch mechanism further includes two protruding ribs and a mounting slot structure. The two protruding ribs respectively protrude from the first component to abut against the two lateral abutting parts. The mounting slot structure is formed on the first component, and the middle abutting part is accommodated inside the mounting slot structure and abuts against an inner wall of the mounting slot structure.

According to an embodiment of the present invention, the connecting portion includes two beams connected to the operating portion and the mounting portion, and the engaging slot is formed between the two beams.

According to an embodiment of the present invention, the latch component further includes at least one stopping protrusion protruding from the operating portion for restraining a travel distance of the operating portion.

According to an embodiment of the present invention, the latch mechanism further includes at least one sliding slot structure formed on the first component, and the at least one stopping protrusion is movable within the at least sliding slot structure.

According to an embodiment of the present invention, the at least one stopping protrusion abuts against a first inner wall of the at least one sliding slot structure when the latch mechanism is in the locking state, and the at least one stopping protrusion abuts against a second inner wall of the at least one sliding slot structure when the latch mechanism is in the releasing state.

According to an embodiment of the present invention, a cross section of the engaging component is circular, and the engaging component engages with the engaging slot in a rotatable manner.

According to an embodiment of the present invention, the operating portion, the mounting portion and the connecting portion substantially form an integral U-shaped structure.

In order to achieve the aforementioned objective, the present invention further discloses a tray assembly. The tray assembly includes at least one tray mount, a storage tray and at least one latch mechanism. The at least one latch mechanism is for engaging the storage tray with the at least one tray mount or disengaging the storage tray from the at least one tray mount. The at least one latch mechanism includes a latch component and an engaging component. The latch component includes an operating portion, a mounting portion disposed on the storage tray, and a connecting portion connected to the operating portion and the mounting portion. The connecting portion is made of resilient material. An engaging slot is formed on the connecting portion. The engaging component is disposed on the at least one tray mount for engaging with or disengaging from the engaging slot. The engaging slot and the engaging component are engaged with each other so as to fix the storage tray on the at least one tray mount when the latch mechanism is in a locking state, and the connecting portion is resiliently deformed by the operating portion to disengage the engaging slot from the engaging component so as to release the storage tray from the at least one tray mount when the operating portion is operated to switch the latch mechanism from the locking state to a releasing state.

According to an embodiment of the present invention, the mounting portion is substantially formed in a tail shape and includes two lateral abutting parts and a middle abutting part, and the latch component is engaged onto the storage tray by the two lateral abutting parts and the middle abutting part of the mounting portion.

According to an embodiment of the present invention, the at least one latch mechanism further includes two protruding ribs and a mounting slot structure. The two protruding ribs respectively protrude from the storage tray to abut against the two lateral abutting parts. The mounting slot structure is formed on the storage tray, and the middle abutting part is accommodated inside the mounting slot structure and abuts against an inner wall of the mounting slot structure.

According to an embodiment of the present invention, the connecting portion includes two beams connected to the operating portion and the mounting portion, and the engaging slot is formed between the two beams.

According to an embodiment of the present invention, the latch component further includes at least one stopping protrusion protruding from the operating portion for restraining a travel distance of the operating portion.

According to an embodiment of the present invention, the at least one latch mechanism further includes at least one sliding slot structure formed on the storage tray, and the at least one stopping protrusion is movable within the at least one sliding slot structure.

According to an embodiment of the present invention, the at least one stopping protrusion abuts against a first inner wall of the at least one sliding slot structure when the latch mechanism is in the locking state, and the at least one stopping protrusion abuts against a second inner wall of the at least one sliding slot structure when the latch mechanism is in the releasing state.

According to an embodiment of the present invention, a cross section of the engaging component is circular, and the engaging component engages with the engaging slot in a rotatable manner.

According to an embodiment of the present invention, the operating portion, the mounting portion and the connecting portion substantially form an integral U-shaped structure.

According to an embodiment of the present invention, the engaging component includes an engaging end for engaging with the engaging slot, a connecting end connected to the tray mount, and a neck portion between the engaging end and the connecting end. The storage tray includes a notch portion. The neck portion of the engaging component engages with the notch portion of the storage tray when the engaging end of the engaging component engages with the engaging slot.

In summary, the present invention utilizes engagement and disengagement of the latch component and the engaging component for achieving assembly and disassembly of the first component (e.g. the storage tray) and the second component (e.g. the tray mount). The latch component can be made of injection molded plastic material, and the operating portion, the mounting portion and the connecting portion substantially can form the integral U-shaped structure. Therefore, the present invention has advantages of low cost of production, simple structure and strong strength. Furthermore, when it is desired to disassemble the first component from the second component, it only has to operate the operating portion of the latch component to resiliently deform the connecting portion for allowing the disassembly of the first component and the second component by the disengagement of the latch component and the engaging component. Therefore, the present invention has good operability.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
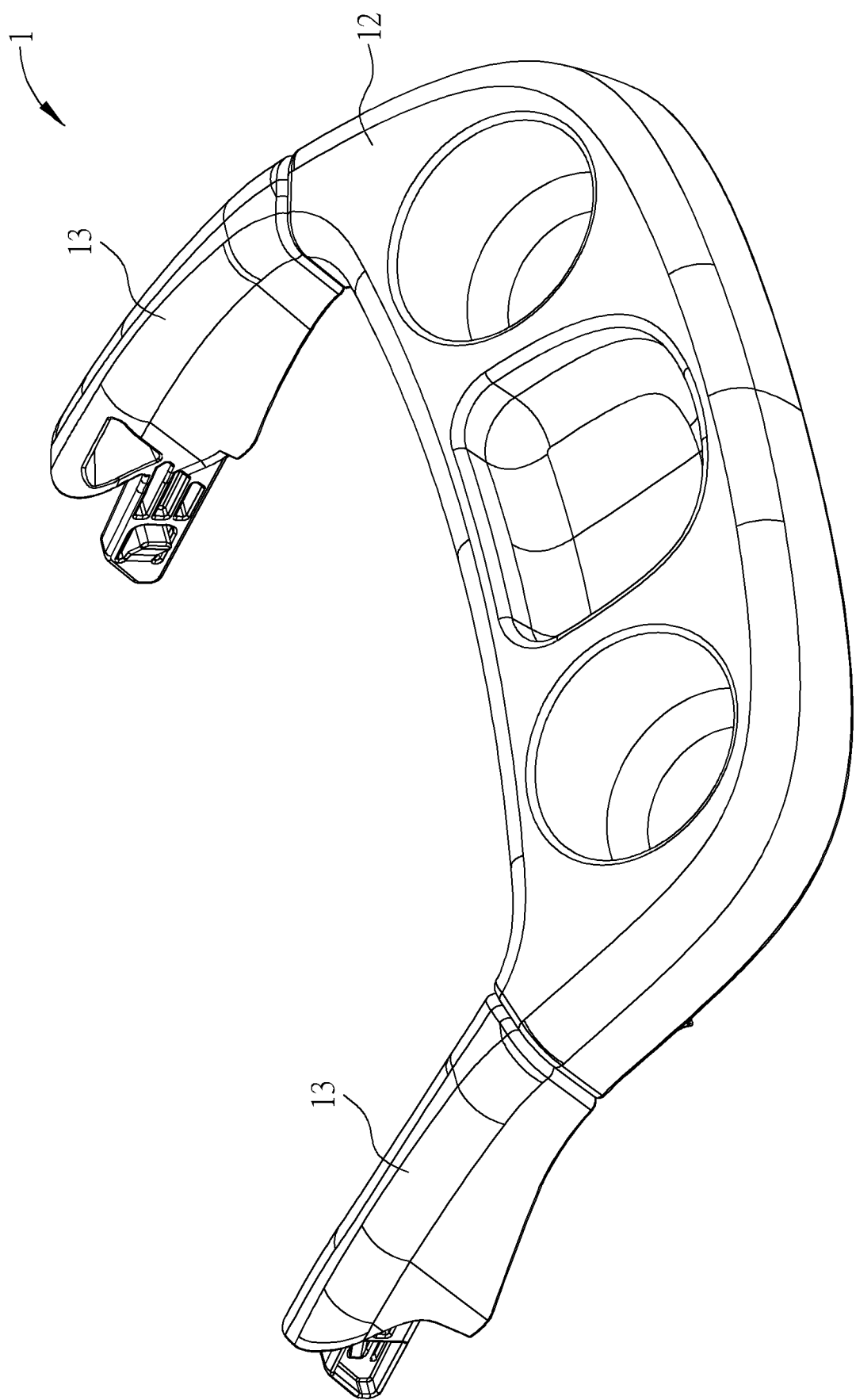
FIG. 1 is a schematic diagram of a tray assembly according to an embodiment of the present invention.
Figure 2:
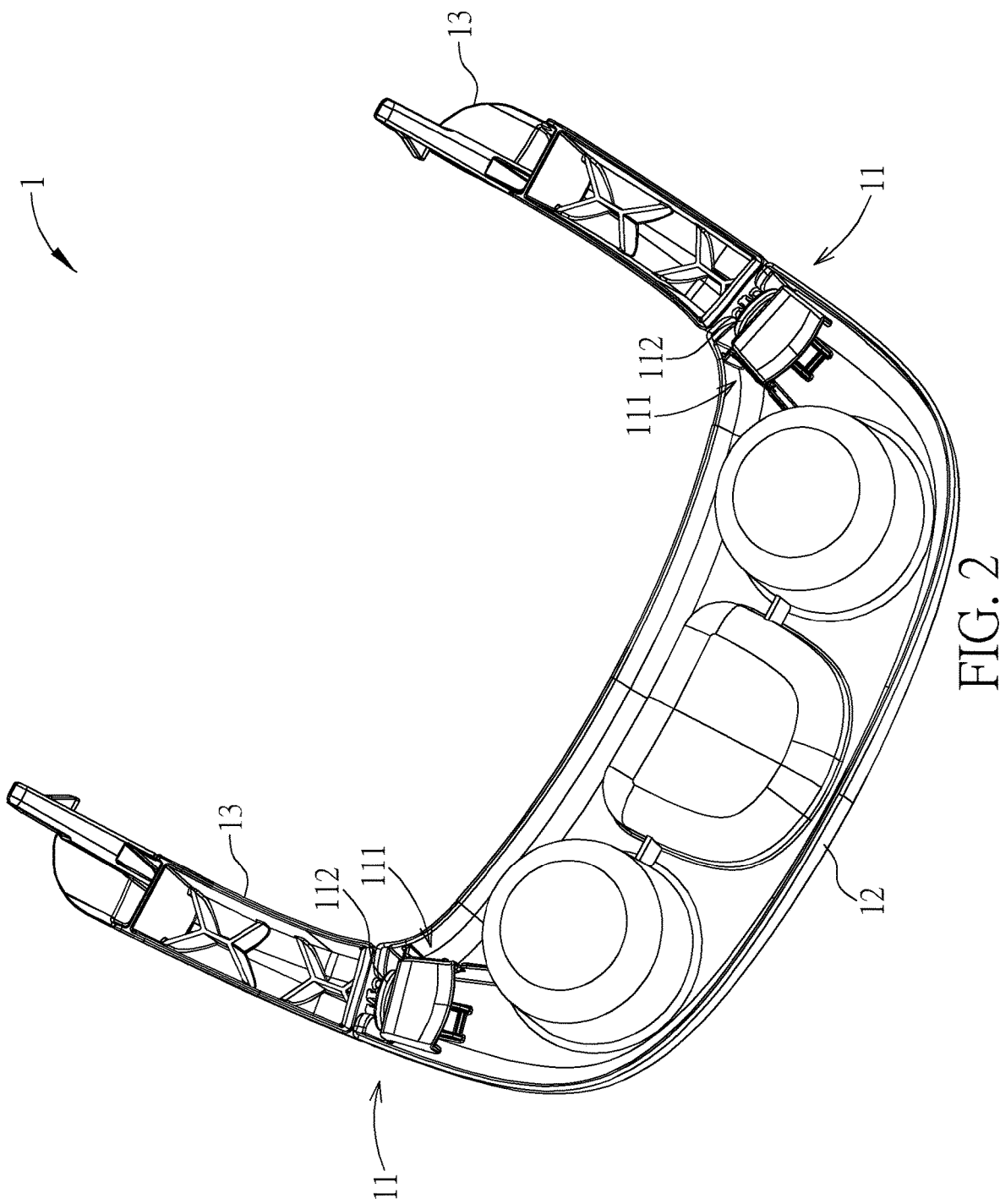
FIG. 2 is a bottom view diagram of the tray assembly according to the embodiment of the present invention.

Please refer to FIG. 1 and FIG. 2. FIG. 1 is a schematic diagram of a tray assembly 1 according to an embodiment of the present invention. FIG. 2 is a bottom view diagram of the tray assembly 1 according to the embodiment of the present invention. As shown in FIG. 1 and FIG. 2, the tray assembly 1 includes two latch mechanisms 11, a storage tray 12 and two tray mounts 13. The two tray mounts 13 can be disposed on a child product, such as a child high chair. Each latch mechanism 11 is disposed between the storage tray 12 and the corresponding tray mount 13 for engaging the storage tray 12 with the corresponding tray mount 13 or disengaging the storage tray 12 from the corresponding tray mount 13. That is, the storage tray 12 is detachably installed on the two tray mounts 13 by the two latch mechanisms 11. However, the numbers of the latch mechanism and the tray mount of the present invention are not limited to this embodiment. For example, in another embodiment, the tray assembly also can include only one latch mechanism and one tray mount at one side of the child product. Furthermore, the latch mechanism of the present invention also can be disposed between two different components, such as a first component and a second component, other than the storage tray and the tray mount for providing removability of the first component and the second component.

Figure 3:
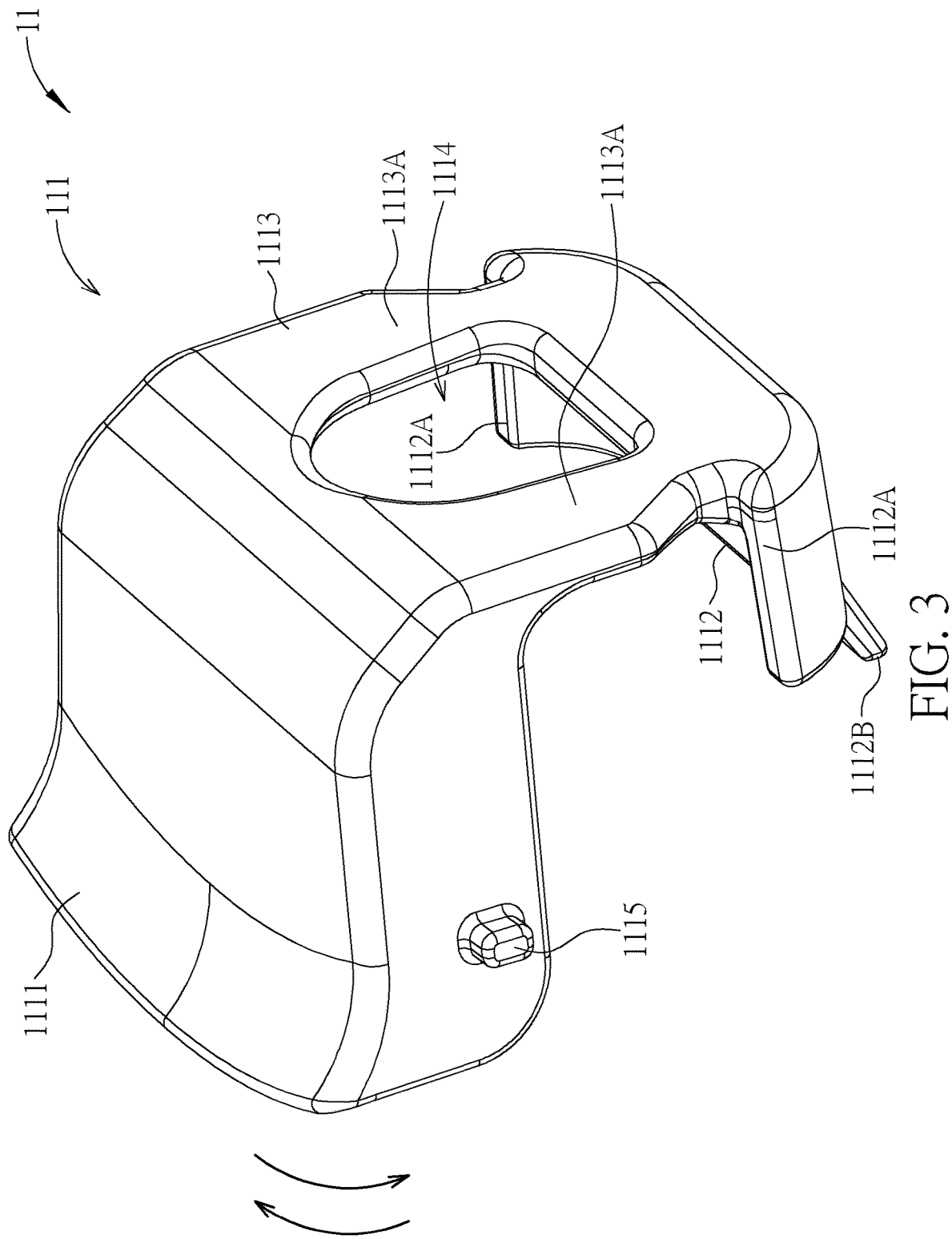
FIG. 3 and FIG. 4 are diagrams of a latch component of a latch mechanism at different views according to the embodiment of the present invention.
Figure 4:
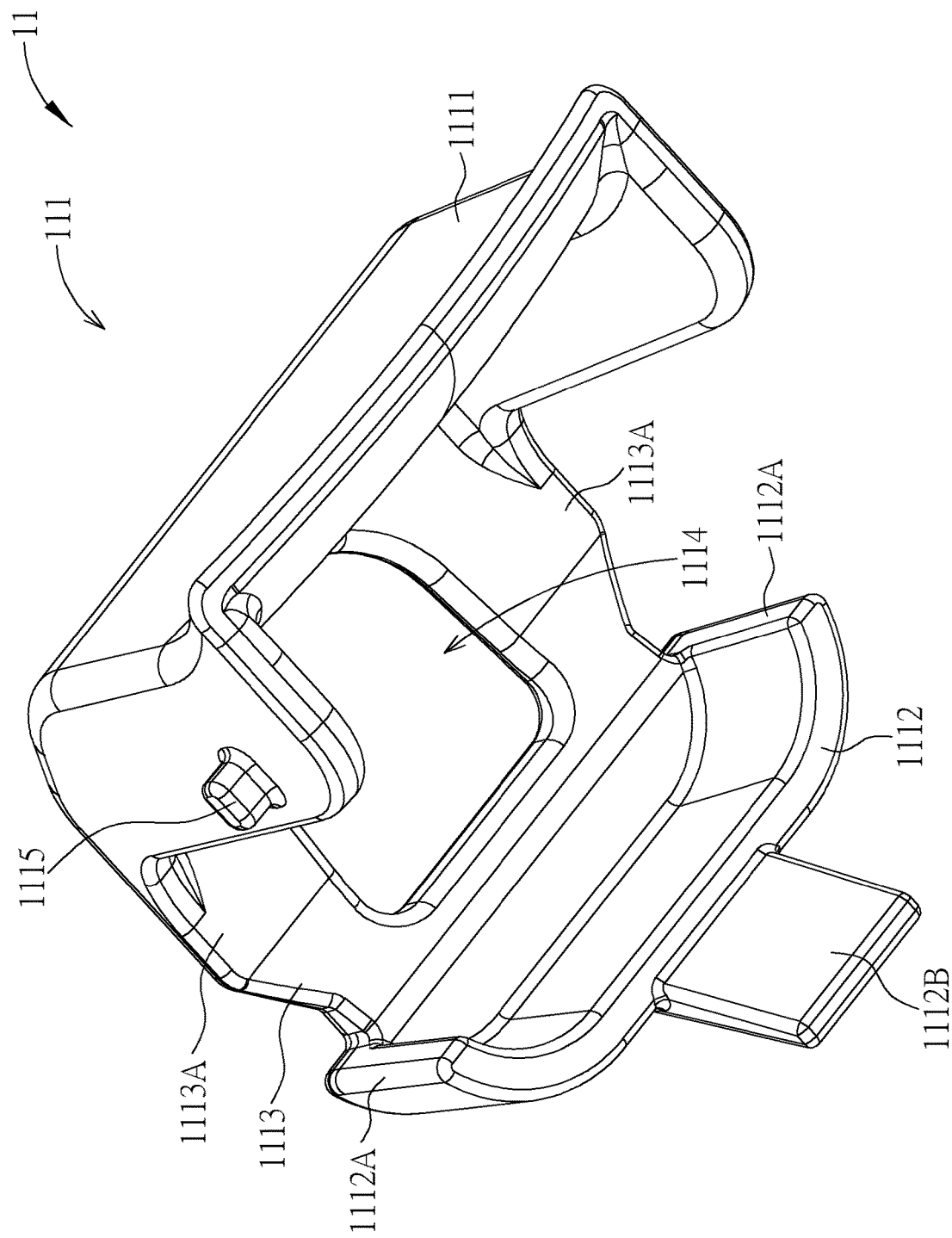
Figure 5:
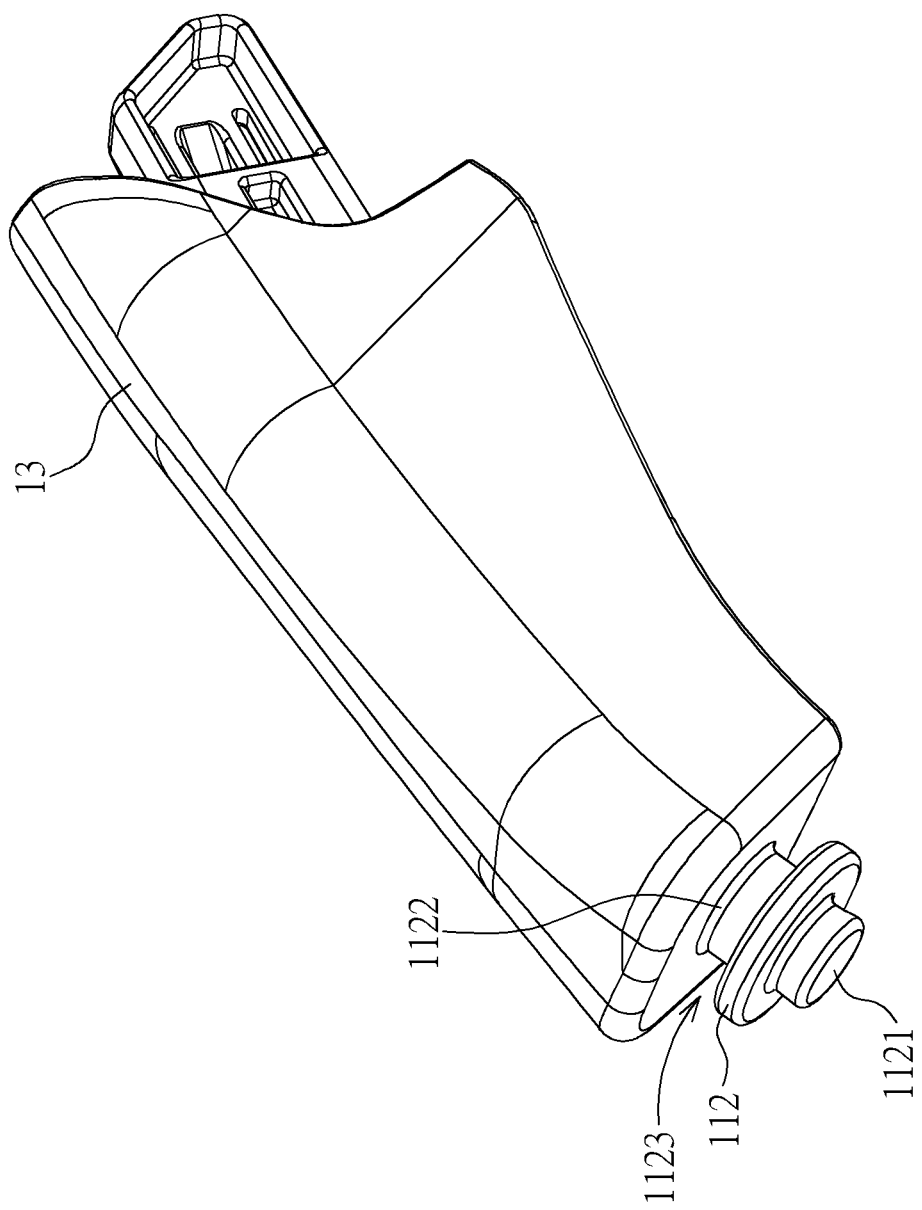
FIG. 5 is a diagram of a tray mount and an engaging component of the latch mechanism according to the embodiment of the present invention.
Figure 6:
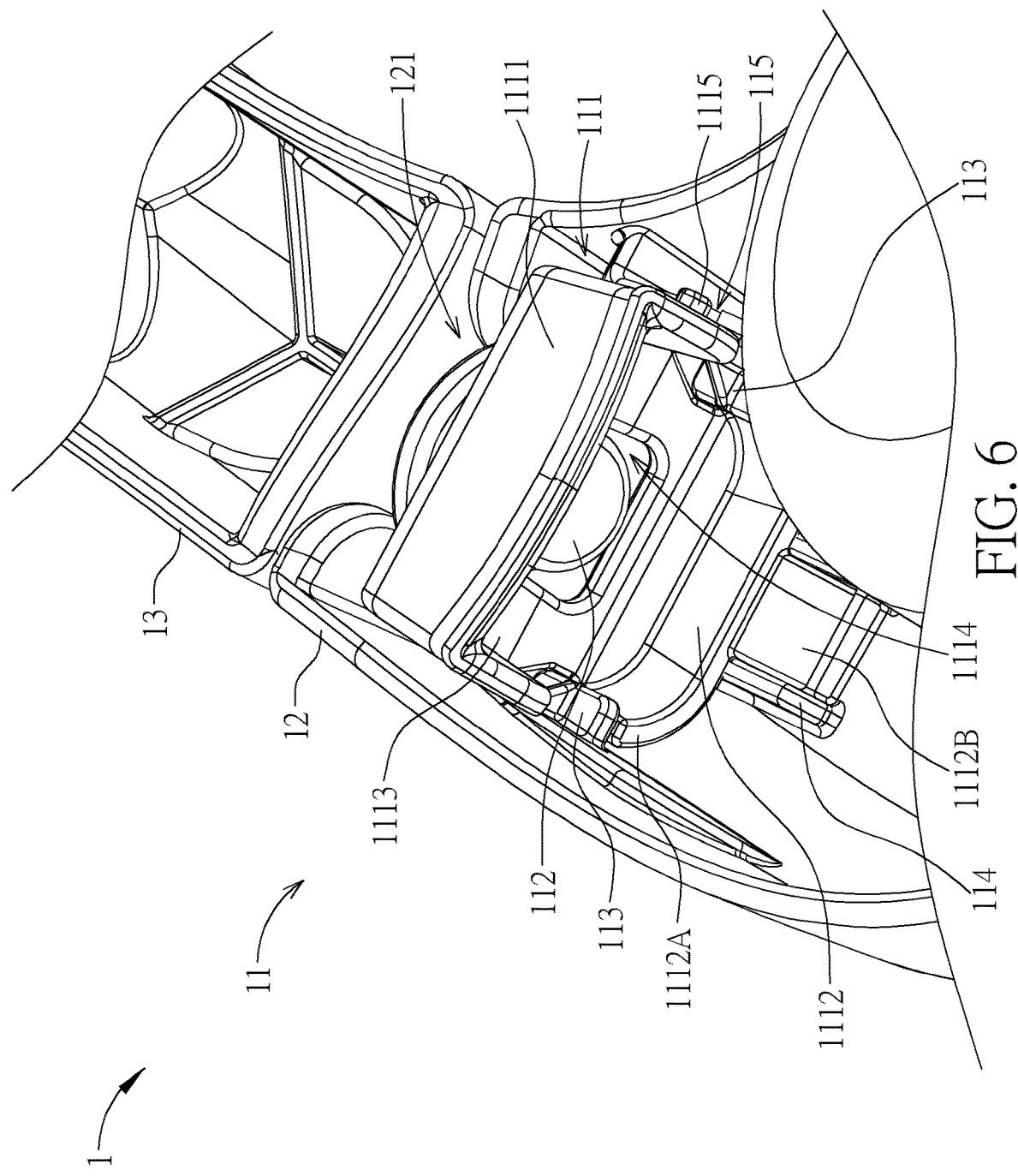
FIG. 6 and FIG. 7 are partial diagrams of the tray assembly at different views according to the embodiment of the present invention.
Figure 7:
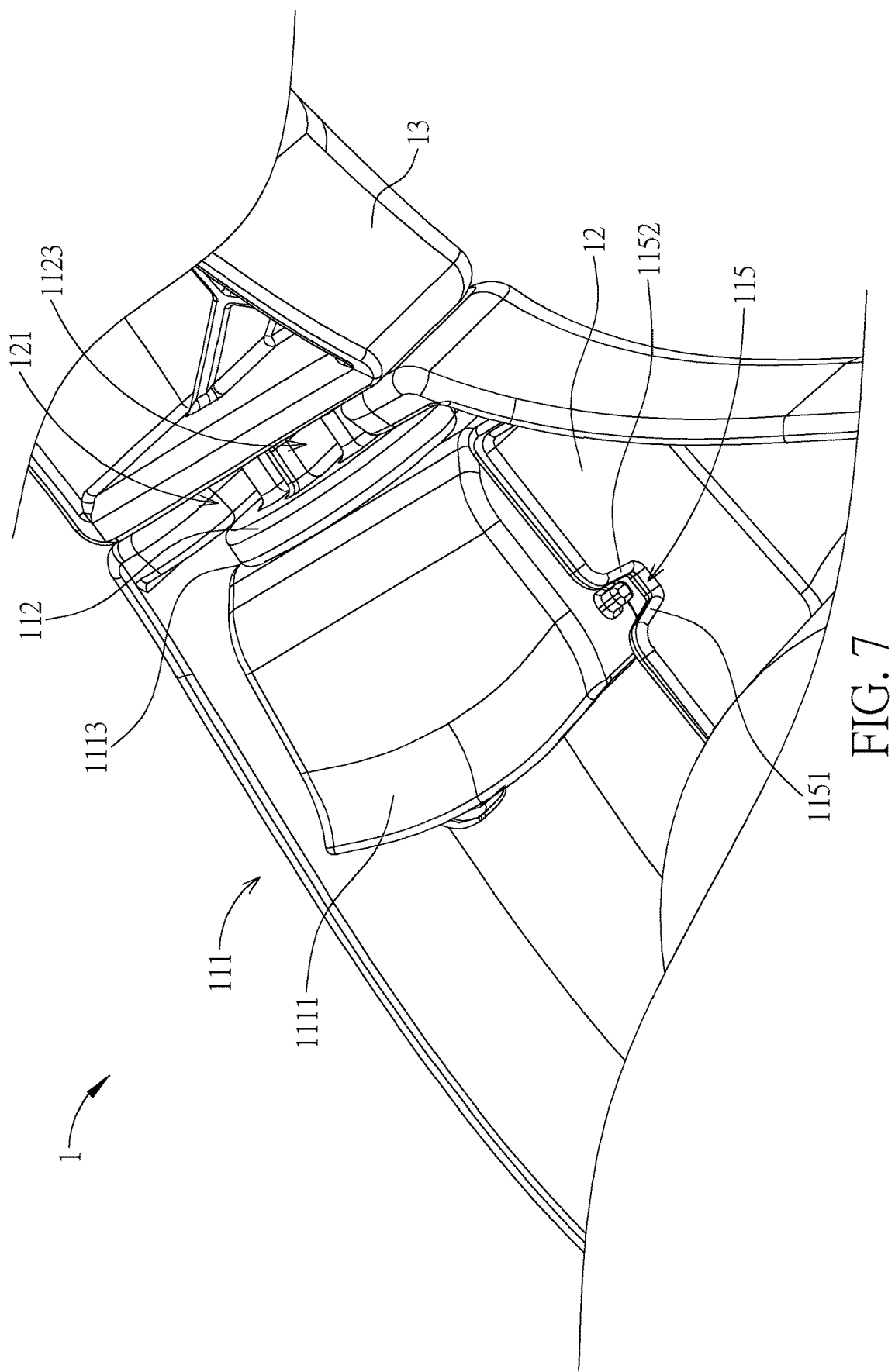

The two latch mechanisms 11 can have the same structure and operation, and therefore the latch mechanism 11 at one side is introduced as follows for simplicity. Please refer to FIG. 1 to FIG. 7. FIG. 3 and FIG. 4 are diagrams of a latch component 111 of the latch mechanism 11 at different views according to the embodiment of the present invention. FIG. 5 is a diagram of the tray mount 13 and an engaging component 112 of the latch mechanism 11 according to the embodiment of the present invention. FIG. 6 and FIG. 7 are partial diagrams of the tray assembly 1 at different views according to the embodiment of the present invention. As shown in FIG. 1 to FIG. 7, the latch mechanism 11 includes the latch component 111 and the engaging component 112. The latch component 111 is disposed on a bottom side of the storage tray 12 and includes an operating portion 1111, a mounting portion 1112 disposed on the storage tray 12, and a connecting portion 1113 connected to the operating portion 1111 and the mounting portion 1112. The connecting portion 1113 is made of resilient material. An engaging slot 1114 is formed on the connecting portion 1113. The engaging component 112 is disposed on the corresponding tray mount 13 for engaging with or disengaging from the engaging slot 1114. The engaging slot 1114 and the engaging component 112 are engaged with each other so as to fix the storage tray 12 on the corresponding tray mount 13 when the latch mechanism 11 is in a locking state. The connecting portion 1113 is resiliently deformed by the operating portion 1111 to disengage the engaging slot 1114 from the engaging component 112 so as to release the storage tray 12 from the corresponding tray mount 13 when the operating portion 1111 is operated to switch the latch mechanism 11 from the locking state to a releasing state.

Preferably, in this embodiment, the latch component 111 can be made of injection molded plastic material. Furthermore, a cross section of the engaging component 112 can be circular, so that the engaging component 112 engages with the engaging slot 1114 in a rotatable manner. However, it is not limited to this embodiment.

Specifically, as shown in FIG. 3 to FIG. 4, in order to increase mechanical strength of the latch component 111, the operating portion 1111, the mounting portion 1112 and the connecting portion 1113 can substantially form an integral U-shaped structure. Furthermore, the connecting portion 1113 includes two beams 1113A connected to the operating portion 1111 and the mounting portion 1112, and the engaging slot 1114 is formed between the two beams 1113A for engaging with the engaging component 112.

As shown in FIG. 3 to FIG. 6, in order to securely fit the latch component 111 onto the storage tray 12, the mounting portion 1112 is substantially formed in a tail shape and includes two lateral abutting parts 1112A and a middle abutting part 1112B. The latch component 111 is engaged onto the storage tray 12 by the two lateral abutting parts 1112A and the middle abutting part 1112B of the mounting portion 1112. The latch mechanism 11 further includes two protruding ribs 113 and a mounting slot structure 114. The two protruding ribs 113 respectively protrude from the storage tray 12 to abut against the two lateral abutting parts 1112A. The mounting slot structure 114 is formed on the storage tray 12, and the middle abutting part 1112B is accommodated inside the mounting slot structure 114 and abuts against an inner wall of the mounting slot structure 114. By the aforementioned features, the latch component 111 can be firmly engaged onto the storage tray 12. Furthermore, the tail-shaped mounting portion 1112 also allows length of the two beams 1113A to be maximized in a small design space.

As shown in FIG. 3, FIG. 4, FIG. 6 and FIG. 7, the latch component 111 further includes one stopping protrusion 1115 protruding from a side of the operating portion 1111 for restraining a travel distance of the operating portion 1111. The latch mechanism 11 further includes a sliding slot structure 115 formed on the storage tray 12 and corresponding to the stopping protrusion 1115. The stopping protrusion 1115 is movable within the sliding slot structure 115. The stopping protrusion 1115 abuts against a first inner wall 1151 of the sliding slot structure 115 when the latch mechanism 11 is in the locking state, and the stopping protrusion 1115 abuts against a second inner wall 1152 of the sliding slot structure 115 when the latch mechanism 11 is in the releasing state. Therefore, it prevents an excessive deformation of the connecting portion 1112 caused by the excessive travel distance of the operating portion 1111 to extend a service life of the latch component 111. However, the numbers of the stopping protrusion 1115 and the sliding slot structure 115 are not limited to this embodiment. For example, in another embodiment, the latch mechanism also can include two stopping protrusions on two opposite sides of the operating portion and two sliding slot structures formed on the storage tray and corresponding to the two stopping protrusions.

Besides, as shown in FIG. 5 to FIG. 7, in this embodiment, the engaging component 112 can include an engaging end 1121 for engaging with the engaging slot 1114, a connecting end 1122 opposite to the engaging end 1121 and connected to the tray mount 13, and a neck portion 1123 between the engaging end 1121 and the connecting end 1122. The storage tray 12 can include a notch portion 121. The neck portion 1123 of the engaging component 112 engages with the notch portion 121 of the storage tray 12 when the engaging end 1121 of the engaging component 112 engages with the engaging slot 1114, so as to secure engagement of the engaging component 112 and the engaging slot 1114. However, it is not limited to this embodiment.

Figure 8:
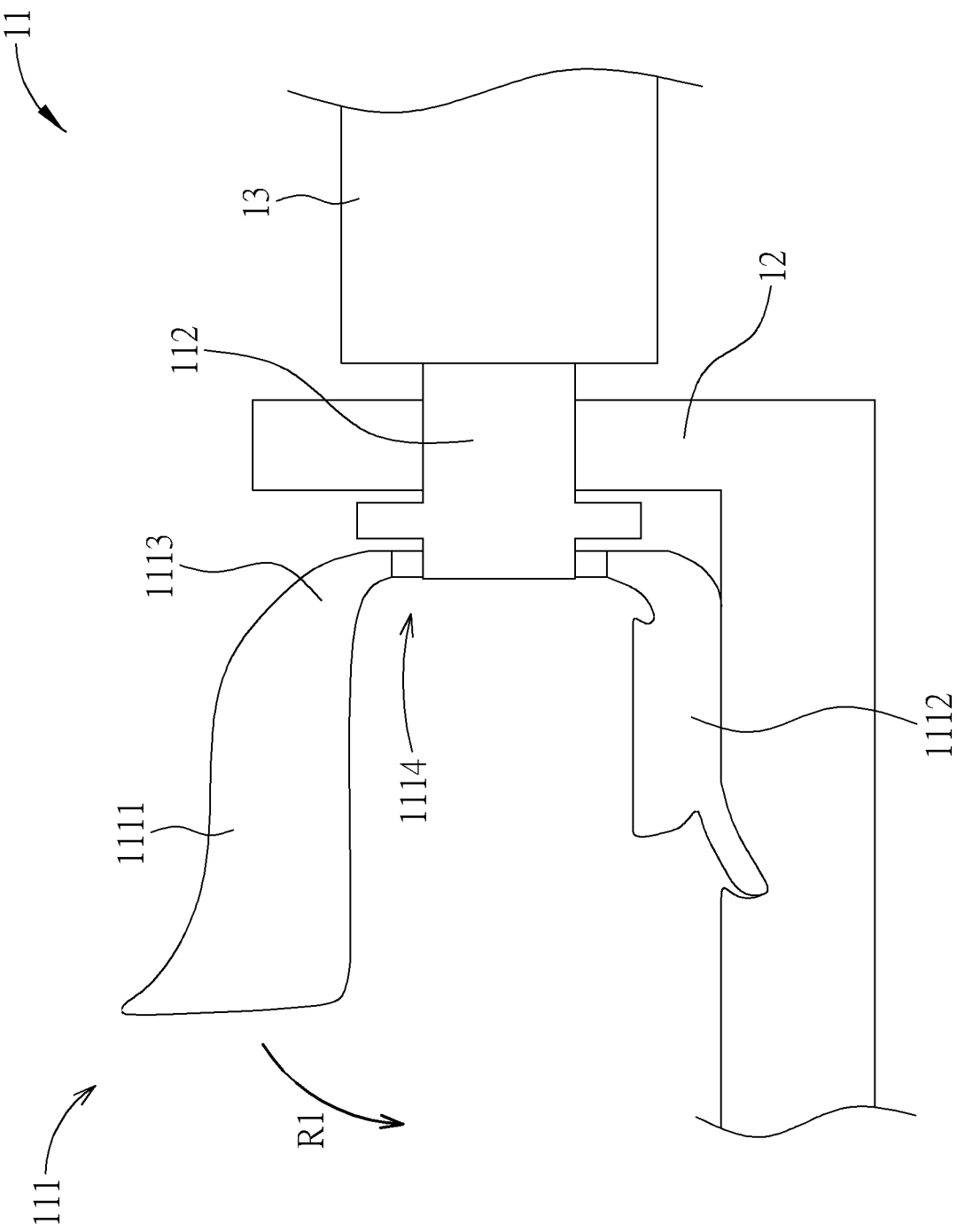
FIG. 8 is a partial diagram illustrating the latch mechanism is in a locking state according to the embodiment of the present invention.
Figure 9:
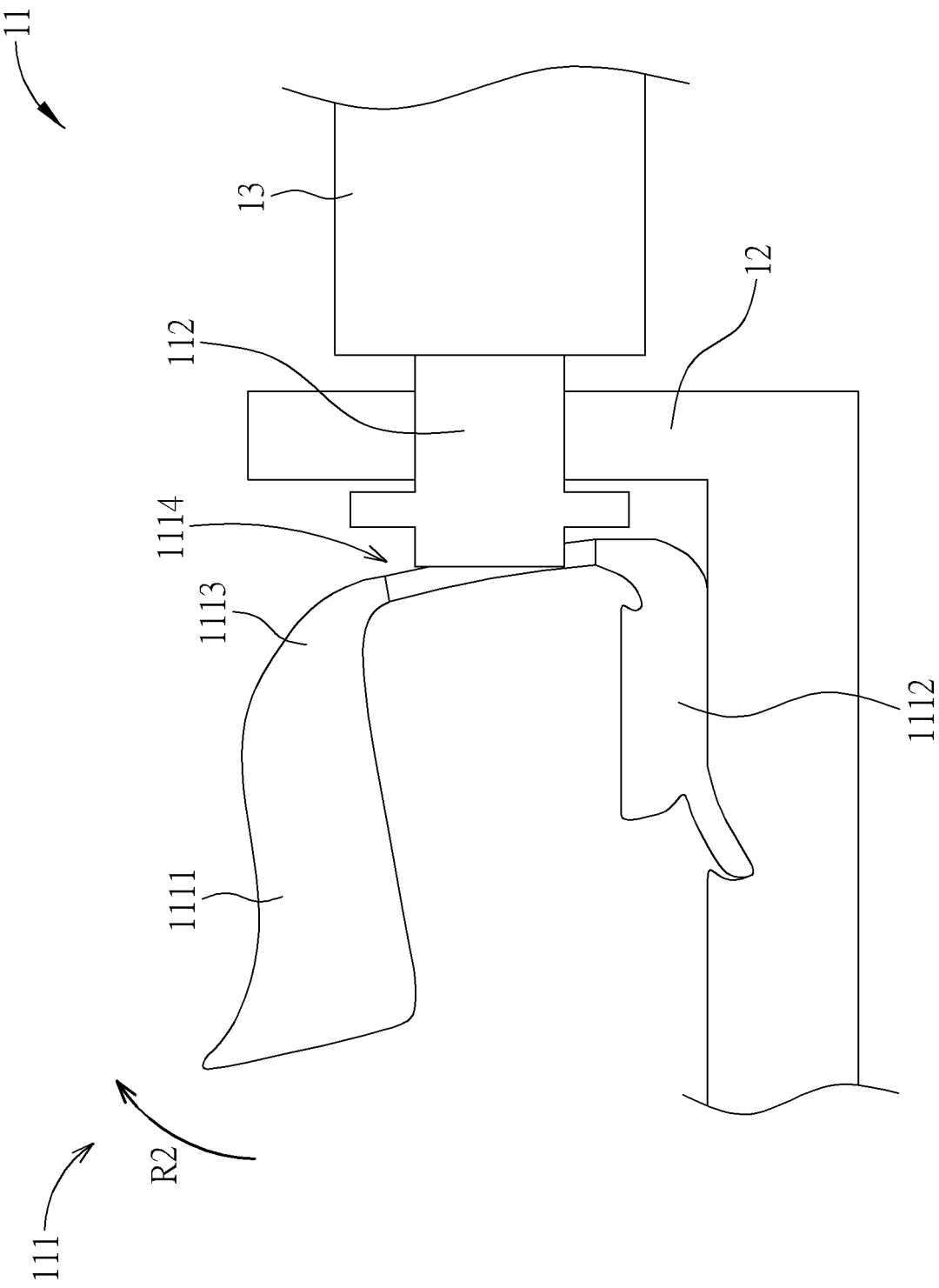
FIG. 9 is a partial diagram illustrating the latch mechanism is in a releasing state according to the embodiment of the present invention.
Figure 10:
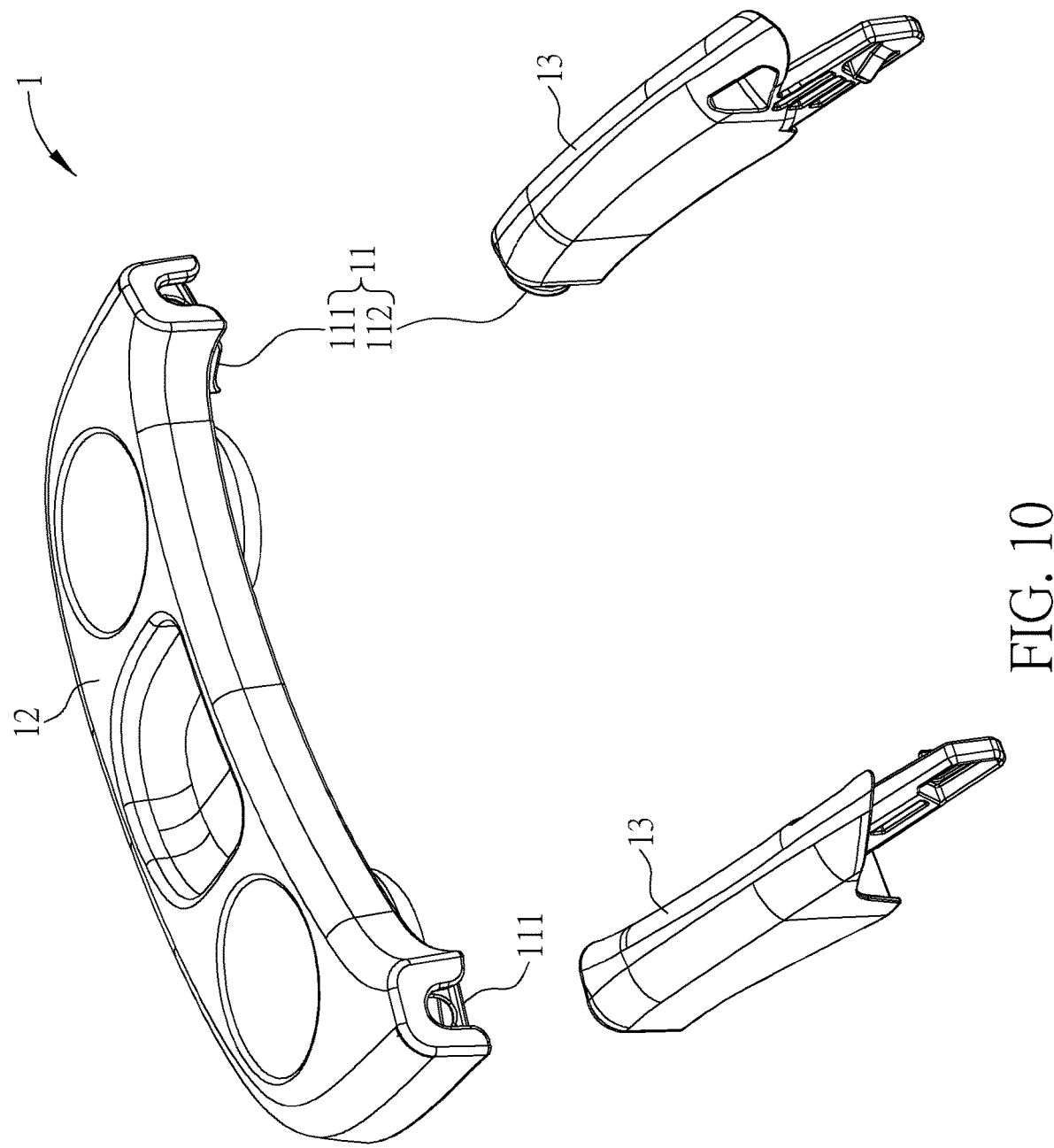
FIG. 10 is a diagram of the tray assembly in a disassembling state according to the embodiment of the present invention.

Please refer to FIG. 1, FIG. 2, and FIG. 8 to FIG. 10. FIG. 8 is a partial diagram illustrating the latch mechanism 11 is in the locking state according to the embodiment of the present invention. FIG. 9 is a partial diagram illustrating the latch mechanism 11 is in the releasing state according to the embodiment of the present invention. FIG. 10 is a diagram of the tray assembly 1 in a disassembling state according to the embodiment of the present invention. When it is desired to detach the storage tray 12 from the tray mount 13, the operating portion 1111 of the latch component 111 can be forced by a user so as to be operated to resiliently deform the connecting portion 1113 to disengage the engaging component 112 from the engaging slot 1114 along a first direction R1 as shown in FIG. 8, so as to release the storage tray 12 from the tray mount 13. Once the two latch mechanisms 11 are in the releasing states as shown in FIG. 9, the storage tray 12 can be lifted to remove from the tray mount 13 easily as shown in FIG. 10. When it is desired to attach the storage tray 12 onto the tray mount 13, the operating portion 1111 of the latch component 111 can be forced by the user so as to be operated to resiliently deform the connecting portion 1113 to allow the engaging component 112 to move to a position as shown in FIG. 9. Afterwards, the connecting portion 1113 of the latch component 111 can recover to make the engaging component 112 engage with the engaging slot 1114 along a second direction R2 as shown in FIG. 9, due to resilient recovering force of the connecting portion 1113 so as to fix the storage tray 12 with the tray mount 13 when the operating portion 1111 of the latch component 111 is released.

Figure 11:
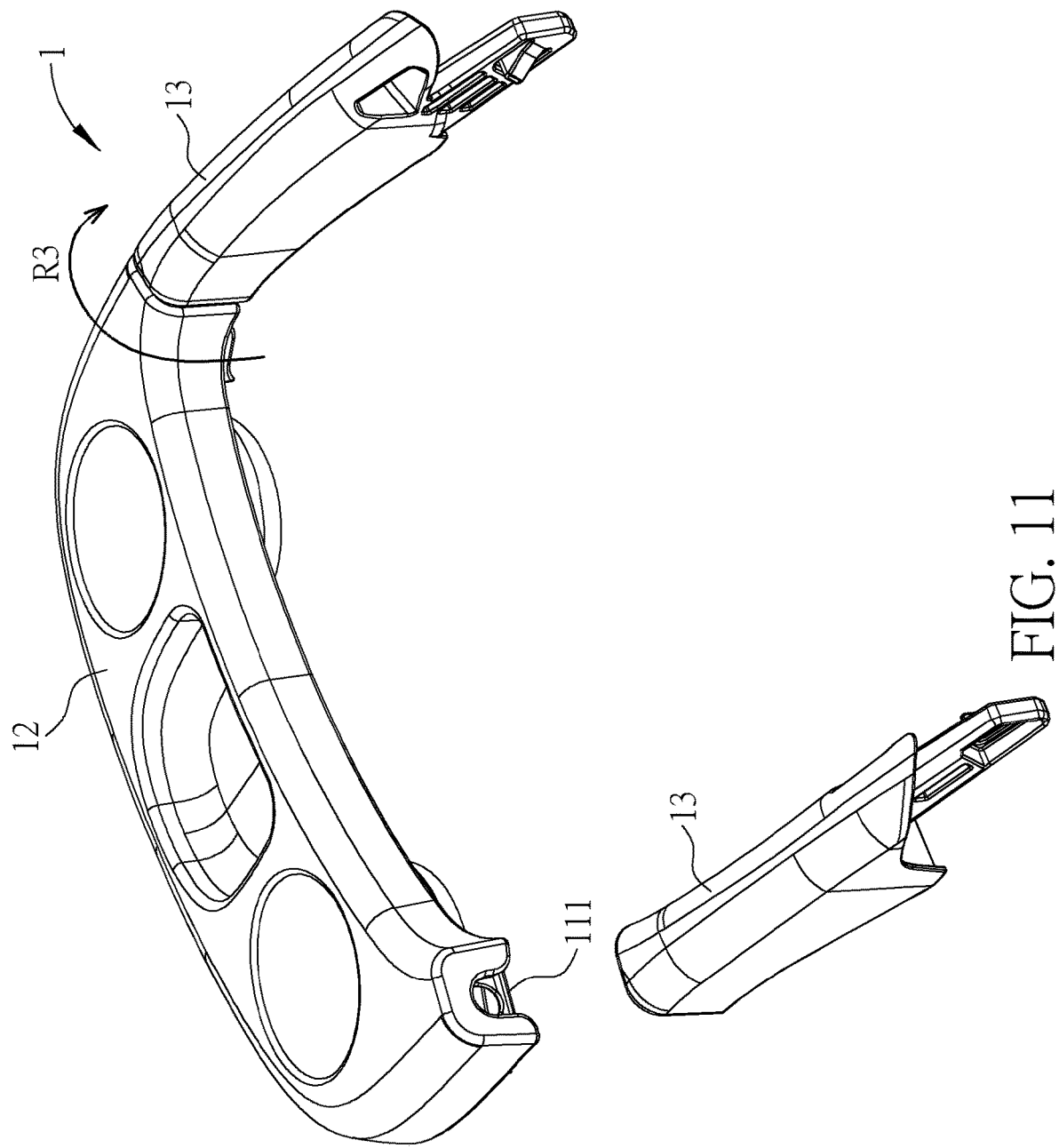
FIG. 11 is a diagram of the tray assembly in a pivoting state according to the embodiment of the present invention.

Please refer to FIG. 11. FIG. 11 is a diagram of the tray assembly 1 in a pivoting state according to the embodiment of the present invention. As shown in FIG. 11, it should be noticed that the cross section of the engaging component 112 is circular, and the engaging component 112 engages with the corresponding engaging slot 1114 in a rotatable manner.

Therefore, the storage tray 12 can pivot relative to the tray mount 13 at a right side along a third direction R3 when the storage tray 12 is disengaged from the tray mount 13 at a left side, which brings convenience in use.

In contrast to the prior art, the present invention utilizes engagement and disengagement of the latch component and the engaging component for achieving assembly and disassembly of the first component (e.g. the storage tray) and the second component (e.g. the tray mount). The latch component can be made of injection molded plastic material, and the operating portion, the mounting portion and the connecting portion substantially can form the integral U-shaped structure. Therefore, the present invention has advantages of low cost of production, simple structure and strong strength. Furthermore, when it is desired to disassemble the first component from the second component, it only has to operate the operating portion of the latch component to resiliently deform the connecting portion for allowing the disassembly of the first component and the second component by the disengagement of the latch component and the engaging component. Therefore, the present invention has good operability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A latch mechanism comprising:
   a latch component comprising an operating portion, a mounting portion disposed on a first component, and a connecting portion connected to the operating portion and the mounting portion, the connecting portion being made of resilient material, an engaging slot being formed on the connecting portion; and
   an engaging component disposed on a second component for engaging with or disengaging from the engaging slot;
   wherein the engaging slot and the engaging component are engaged with each other so as to fix the first component on the second component when the latch mechanism is in a locking state, and the connecting portion is resiliently deformed by the operating portion to disengage the engaging slot from the engaging component so as to release the first component from the second component when the operating portion is operated to switch the latch mechanism from the locking state to a releasing state.

2. The latch mechanism of claim 1, wherein the mounting portion is substantially formed in a tail shape and comprises two lateral abutting parts and a middle abutting part, and the latch component is engaged onto the first component by the two lateral abutting parts and the middle abutting part of the mounting portion, the latch mechanism further comprises two protruding ribs and a mounting slot structure, the two protruding ribs respectively protrude from the first component to abut against the two lateral abutting parts, the mounting slot structure is formed on the first component, and the middle abutting part is accommodated inside the mounting slot structure and abuts against an inner wall of the mounting slot structure.

3. The latch mechanism of claim 1, wherein the connecting portion comprises two beams connected to the operating portion and the mounting portion, and the engaging slot is formed between the two beams.

4. The latch mechanism of claim 1, wherein the latch component further comprises at least one stopping protrusion protruding from the operating portion for restraining a travel distance of the operating portion, and the latch mechanism further comprises at least one sliding slot structure formed on the first component, and the at least one stopping protrusion is movable within the at least one sliding slot structure.

5. The latch mechanism of claim 4, wherein the at least one stopping protrusion abuts against a first inner wall of the at least one sliding slot structure when the latch mechanism is in the locking state, and the at least one stopping protrusion abuts against a second inner wall of the at least one sliding slot structure when the latch mechanism is in the releasing state.

6. The latch mechanism of claim 1, wherein a cross section of the engaging component is circular, and the engaging component engages with the engaging slot in a rotatable manner.

7. The latch mechanism of claim 1, wherein the operating portion, the mounting portion and the connecting portion substantially form an integral U-shaped structure.

8. A tray assembly comprising:
   at least one tray mount;
   a storage tray; and
   at least one latch mechanism for engaging the storage tray with the at least one tray mount or disengaging the storage tray from the at least one tray mount, the at least one latch mechanism comprising:
   a latch component comprising an operating portion, a mounting portion disposed on the storage tray, and a connecting portion connected to the operating portion and the mounting portion, the connecting portion being made of resilient material, an engaging slot being formed on the connecting portion; and
   an engaging component disposed on the at least one tray mount for engaging with or disengaging from the engaging slot;
   wherein the engaging slot and the engaging component are engaged with each other so as to fix the storage tray on the at least one tray mount when the latch mechanism is in a locking state, and the connecting portion is resiliently deformed by the operating portion to disengage the engaging slot from the engaging component so as to release the storage tray from the at least one tray mount when the operating portion is operated to switch the latch mechanism from the locking state to a releasing state.

9. The tray assembly of claim 8, wherein the mounting portion is substantially formed in a tail shape and comprises two lateral abutting parts and a middle abutting part, and the latch component is engaged onto the storage tray by the two lateral abutting parts and the middle abutting part of the mounting portion, the at least one latch mechanism further comprises two protruding ribs and a mounting slot structure, the two protruding ribs respectively protrude from the storage tray to abut against the two lateral abutting parts, the mounting slot structure is formed on the storage tray, and the middle abutting part is accommodated inside the mounting slot structure and abuts against an inner wall of the mounting slot structure.

10. The tray assembly of claim 8, wherein the connecting portion comprises two beams connected to the operating portion and the mounting portion, and the engaging slot is formed between the two beams.

11. The tray assembly of claim 8, wherein the latch component further comprises at least one stopping protrusion protruding from the operating portion for restraining a travel distance of the operating portion, the at least one latch mechanism further comprises at least one sliding slot structure formed on the storage tray, and the at least one stopping protrusion is movable within the at least one sliding slot structure.

12. The tray assembly of claim 11, wherein the at least one stopping protrusion abuts against a first inner wall of the at least one sliding slot structure when the latch mechanism is in the locking state, and the at least one stopping protrusion abuts against a second inner wall of the at least one sliding slot structure when the latch mechanism is in the releasing state.

13. The tray assembly of claim 8, wherein a cross section of the engaging component is circular, and the engaging component engages with the engaging slot in a rotatable manner.

14. The tray assembly of claim 8, wherein the operating portion, the mounting portion and the connecting portion substantially form an integral U-shaped structure.

15. The tray assembly of claim 8, wherein the engaging component comprises an engaging end for engaging with the engaging slot, a connecting end connected to the tray mount, and a neck portion between the engaging end and the connecting end, the storage tray comprises a notch portion, and the neck portion of the engaging component engages with the notch portion of the storage tray when the engaging end of the engaging component engages with the engaging slot.

* * * * *